(12) United States Patent
Pigeon

(10) Patent No.: US 7,901,006 B2
(45) Date of Patent: Mar. 8, 2011

(54) CRANK AND ROD ACTUATOR FOR MOVING A SEAT BACK

(75) Inventor: Philippe Pigeon, Shanghai (CN)

(73) Assignee: Lear Corporation, Southfield, MI (US)

( * ) Notice: Subject to any disclaimer, the term of this patent is extended or adjusted under 35 U.S.C. 154(b) by 136 days.

(21) Appl. No.: 12/193,403

(22) Filed: Aug. 18, 2008

(65) Prior Publication Data

US 2010/0038948 A1 Feb. 18, 2010

(51) Int. Cl.
*B60N 2/22* (2006.01)
(52) U.S. Cl. ................. 297/362.11; 297/361.1
(58) Field of Classification Search ............... 297/361.1, 297/362.11
See application file for complete search history.

(56) References Cited

U.S. PATENT DOCUMENTS

| | | | |
|---|---|---|---|
| 5,483,853 A * | 1/1996 | Moradell et al. | 297/362.11 X |
| 5,895,090 A * | 4/1999 | Farquhar et al. | 297/362.11 X |
| 6,000,751 A | 12/1999 | Kato et al. | |
| 6,000,757 A * | 12/1999 | Sovis | 297/362.11 X |
| 6,193,316 B1 * | 2/2001 | Janke et al. | 297/362.11 |
| 6,520,582 B2 * | 2/2003 | Glance | 297/362.14 |
| 6,540,295 B1 * | 4/2003 | Saberan et al. | 297/362.11 X |
| 7,066,543 B2 * | 6/2006 | Yu | 297/362 X |
| 7,246,845 B2 | 7/2007 | Rashidy et al. | |
| 7,661,760 B2 * | 2/2010 | Nakaya et al. | 297/362.11 X |
| 2008/0150340 A1 | 6/2008 | Sokolla et al. | |
| 2008/0164740 A1 | 7/2008 | Harper et al. | |
| 2009/0026791 A1 * | 1/2009 | Ishijima et al. | 297/361.1 X |

FOREIGN PATENT DOCUMENTS

EP 0838376 A1 4/1998

\* cited by examiner

*Primary Examiner* — Rodney B White
(74) *Attorney, Agent, or Firm* — MacMillan, Sobanski & Todd, LLC

(57) ABSTRACT

A reclining actuator for moving a seat back relative to a seat bottom includes a mounting plate and a crank supported on the mounting plate for movement relative thereto. A rod is provided having a first end and a second end. The first end is connected to the crank and the second end is adapted to engage a seat back. A driver is provided for moving the crank relative to the mounting plate. A seat assembly includes a seat having a seat back and a seat bottom. The seat back is moveable relative to the seat bottom. A crank is connected to a driver for movement. A rod is connected between the crank and the seat back such that movement of the rod causes movement of the seat back.

12 Claims, 4 Drawing Sheets

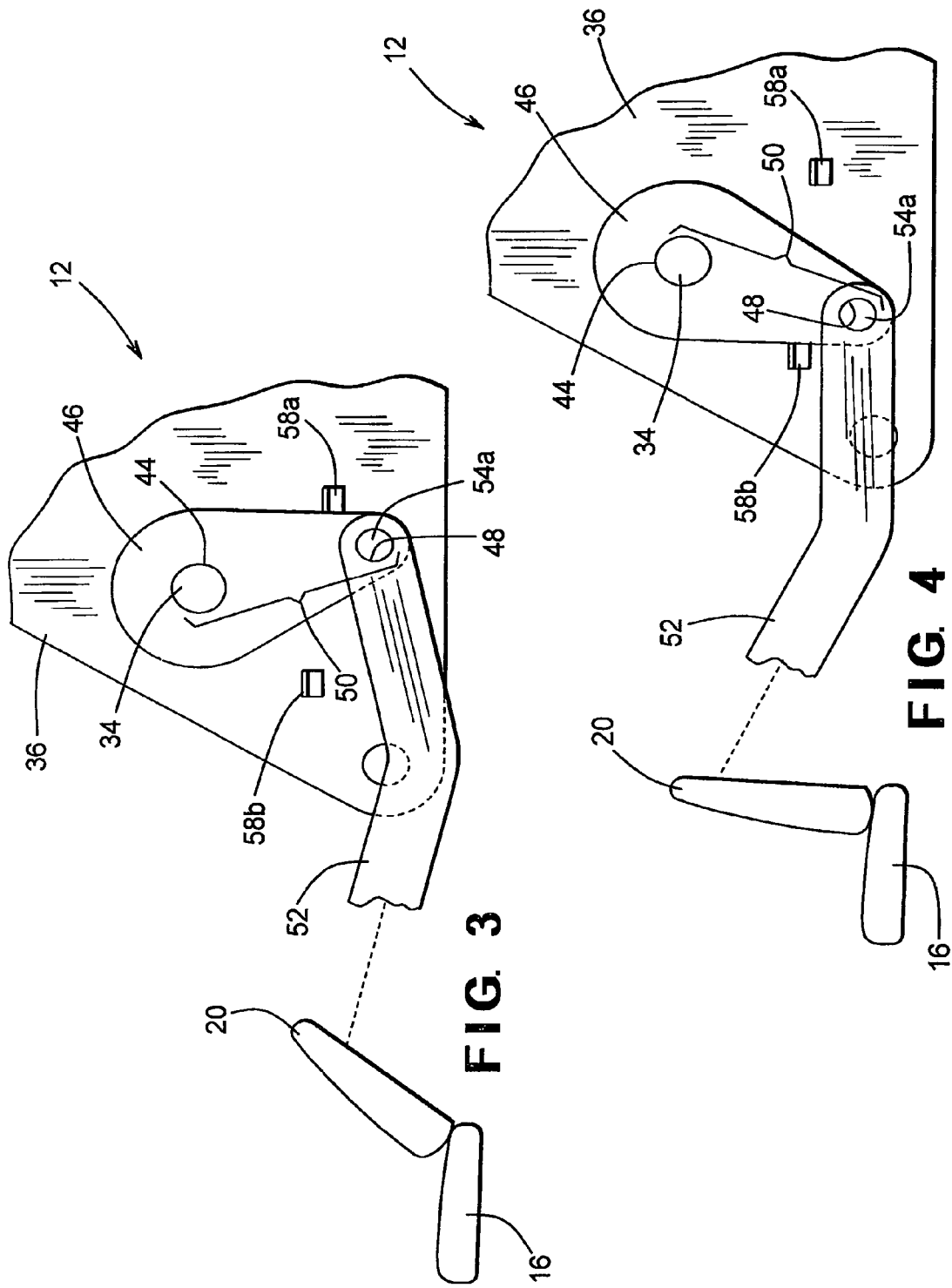

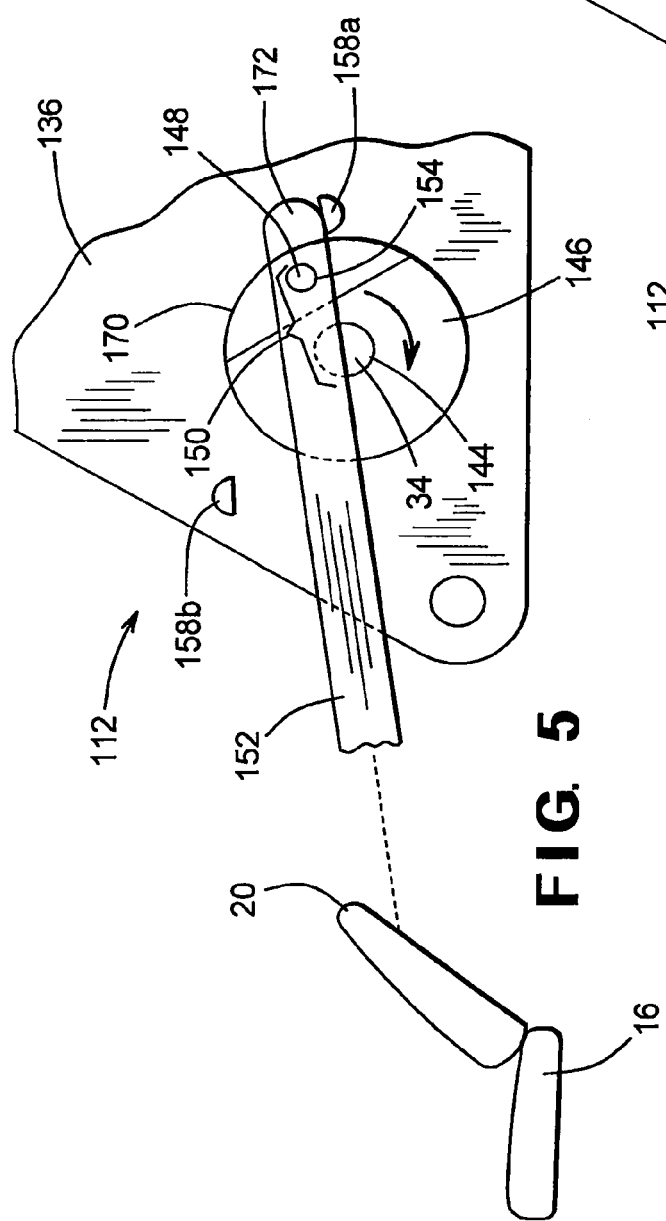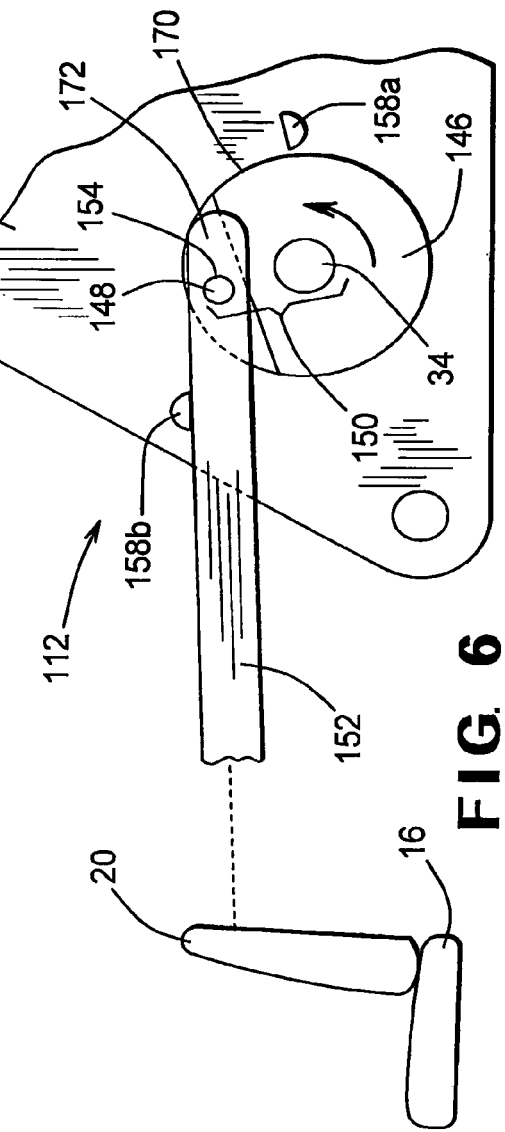

CRANK AND ROD ACTUATOR FOR MOVING A SEAT BACK

BACKGROUND OF THE INVENTION

This invention relates in general to seats having adjustable back portions and in particular to a vehicular seat having a crank and rod actuator to adjust the orientation of the seat back relative to the seat bottom.

Seats are provided to carry occupants and often include a seat bottom and a seat back. In some instances, the angle of the seat back can be adjusted relative to the seat bottom to improve occupant comfort. The seat may include a mechanism to selectively adjust the angle of the seat back relative to the seat bottom and fix the relative orientation therebetween. These adjusting mechanisms may be manually actuated or power actuated, such as by means of an electric motor. Several different power actuated adjusting mechanisms are known in the art to recline the seat back. These power actuated adjusting mechanisms may differ depending on the seat configuration or location within the vehicle. For example, some adjusting mechanisms are provided on seat configurations where the seat back is clear of a structure, such as a vehicle equipped with bucket seats.

Some seats, however, are located where a portion of the vehicle structure abuts the seat back. For example, the rear seats in some vehicles may have portions of the seat back situated against the vehicle body. Sometimes, these rear seats are equipped with two or more seat back sections that are hinged. The hinged seat back sections may fold forward to provide a flat surface for carrying cargo and may also provide access to other vehicle compartments such as, for example, a trunk. These forward folding seat backs may further include a latching mechanism to secure the seat back in an upright position to carry occupants.

Some hinged seats include a powered actuator to recline the seat back relative to the seat bottom. One such powered actuator includes a rack and pinion arrangement to move the seat back to reclined and upright positions. Because of space constraints, vehicle packaging restrictions, and durability needs, these reclining mechanisms can become complicated and expensive. Thus, it would be desirable to provide a simple and cost effective device to recline a seat back that can be installed in various locations in the vehicle. It would further be desirable to provide such a mechanism to recline a folding seat having a latched seat back.

SUMMARY OF THE INVENTION

This invention relates to a reclining actuator for moving a seat back relative to a seat bottom. The reclining actuator includes a mounting plate and a crank supported on the mounting plate for movement relative thereto. A rod is provided having a first end and a second end. The first end of the rod is connected to the crank. The second end of the rod is adapted to engage the seat back.

This invention further relates to a seat assembly having a seat that includes a seat back and a seat bottom. The seat back is moveable relative to the seat bottom. The seat assembly further includes a driver and a crank connected to the driver for movement. A rod is connected between the crank and the seat back such that movement of the rod causes movement of the seat back.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a side elevational, schematic view of portions of the seat and the first embodiment of the reclining actuator of FIG. 1 showing the seat back in a reclined position.

FIG. 4 is a side elevational, schematic view of portions of the seat and the first embodiment of the reclining actuator of FIG. 3 showing the seat back in an upright position.

FIG. 5 is a side elevational, schematic view similar to FIG. 3 of portions of a seat and a second embodiment of a reclining actuator showing the seat back in a reclined position.

FIG. 6 is a side elevational, schematic view of portions of the seat and the second embodiment of the reclining actuator of FIG. 5 showing the seat back in an upright position.

DETAILED DESCRIPTION OF THE PREFERRED EMBODIMENTS

Figure 1:
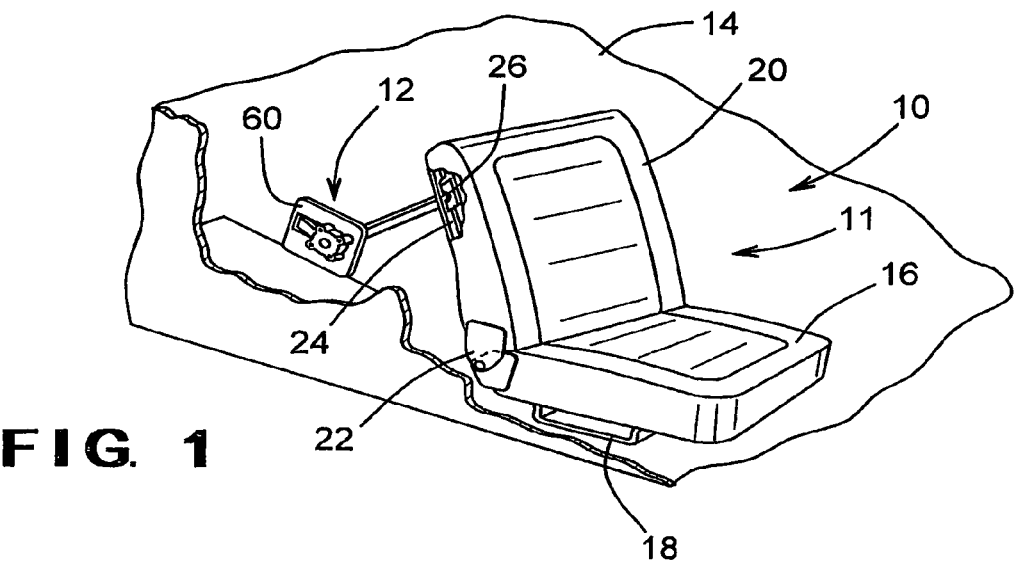
FIG. 1 is a perspective view, partially broken away, of a portion of a seat assembly including a first embodiment of a reclining actuator.

Referring now to the drawings, there is illustrated in FIG. 1 a seat assembly, shown generally at 10, having a seat 11 and a reclining actuator 12 in accordance with the various embodiments of the invention. The seat assembly 10 is shown mounted in a portion of a vehicle 14 to illustrate one environment for use of the various embodiments of the invention. However, the scope of this invention is not intended to be limited for use with the specific structure of the seat assembly 10 or the vehicle 14 illustrated in FIG. 1. On the contrary, as will become apparent below, this invention may be used in any desired environment for the purposes described below.

The seat 11 of the seat assembly 10 includes a seat bottom 16 having a seat mount 18 that is secured to the vehicle 14. The folding seat 11 further includes a seat back 20 and a hinge 22. The hinge 22 may be any conventional structure that allows the seat back 20 to pivot forward and rearward or otherwise move relative to the seat bottom 16. The hinge 22 may connected between the seat bottom 16 and the seat back 20, though such is not required. Alternatively, the hinge 22 may connect the seat back 20 to a portion of the vehicle 14. The seat 11 further includes a seat frame 24. Though shown as part of the seat back 20 it should be understood that the seat frame 24 may be provided as part of the seat bottom 16 as well. A latch 26 is fixed to a portion of the seat frame 24. The latch 26 is conventional in the art and provides for selective release and engagement of the seat back 20 to the reclining actuator 12. The latch 26, however, may be any structure that engages the seat back 20 to the reclining actuator 12 such as, for example, a simple pivot or hinge. In a preferred embodiment, the latch 26 provides a pivoting degree of freedom of movement between the reclining actuator 12 and the seat back 20.

Figure 2:
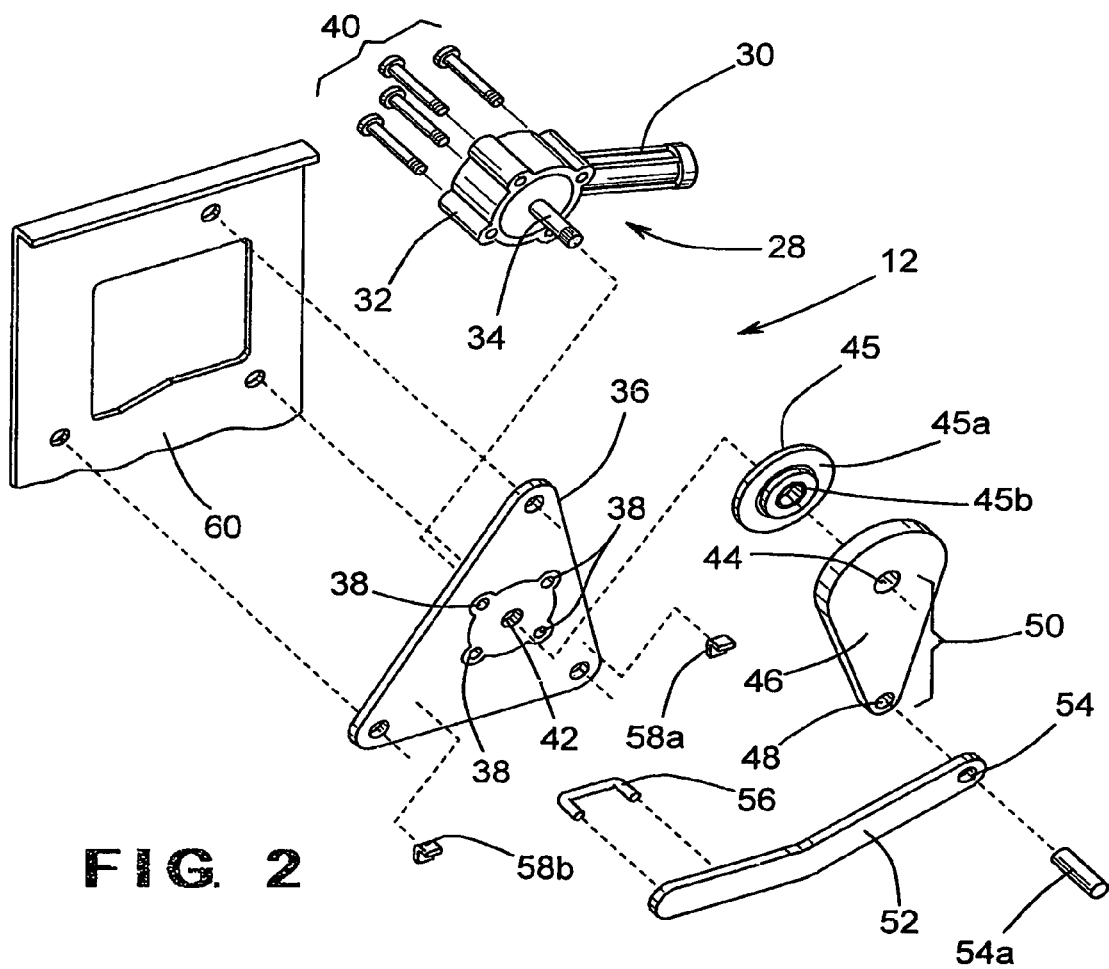
FIG. 2 is an enlarged exploded, perspective view of the first embodiment of the reclining actuator of FIG. 1.

Referring now to FIG. 2, a first embodiment of the reclining actuator 12 includes a driver 28 such as, for example, an electric motor 30 and a gear set 32. The electric motor 30 and gear set 32 are conventional in the art and may be other than as illustrated. For example, the electric motor 30 may be a hydraulic motor. Additionally, the electric motor 30 may be replaced by a manually operated hand crank or wheel device. The gear set 32, which is also conventional in the art, is shown as a right angle drive that directs rotary motion through a ninety degree angle, though such is not required. The gear set 32 may transfer motion through any angle. Alternatively, the gear set 32 may be omitted if desired. The driver 28 includes an output shaft 34.

The driver 28 is fixed to a mounting plate 36 through mounting holes 38 by way of fasteners 40 such as, for example, bolts, screws, rivets, studs, and the like, though such is not required. Alternatively, the mounting plate 36 may be formed integrally with the gear set 32. The output shaft 34 extends through a center aperture 42 formed through the mounting plate 36. The output shaft 34 engages a driven aperture 44 formed through a first end of a crank 46. The driven aperture 44 may include a load carrying profile, such as a toothed spline, keyway and keyed connection, or any other geometric shape such as, for example, square, hexagonal, and the like. The crank 46 includes a second end having a driving aperture 48 that is spaced apart from the driven aperture 44 by a crank offset distance 50. The crank offset 50 may be a fixed distance or may be adjustable by way of a plurality of driving apertures 48 or the driving aperture 48 configured as an elongated slot if so desired.

An optional second stage recliner 45 may be provided between the mounting plate 36 and the crank 46. The second stage recliner 45 includes a fixed side 45a that engages the mounting plate 36 and a driving side 45b that engages the crank 46. The output shaft 34 engages the driving side 45b of the second stage recliner 45, which in turn drives the crank 46. The purpose of the second stage recliner will be explained below.

An actuating rod 52 includes a rod aperture 54 formed through one end that pivotally engages the driving aperture 48. The actuating rod 52 is illustrated having a bend formed therein. However, the actuating rod 52 may be any configuration or geometry that connects the crank 46 to the seat back 20. The rod aperture 54 and the driving aperture 48 may be pivotally connected by way of a pin 54a fastener and may further include bushings, bearings, and the like if desired. The actuating rod 52 includes a latch striker 56 fixed thereto and spaced apart from the rod aperture 54. The latch striker 56 is adapted to engage the latch 26 and may also allow the actuating rod 52 to pivot relative to the seat back 20. At least one stop 58 (two in the illustrated embodiment, 58a and 58b) is fixed to the mounting plate 36, the purpose of which will be explained below. Alternatively, the at least one stop 58 may be fixed to a portion of the vehicle 14 if desired. The mounting plate 36 of the reclining actuator 12 engages a portion of the vehicle 14 such as, for example, a body bracket 60. The mounting plate 36 may be welded, bolted, screwed, snap fitted, adhesively bonded, or otherwise fixed or removably connected to the body bracket 60 in any desired manner. The body bracket 60 and the seat mount 18 may have a fixed relationship, and thus the same frame of reference. Alternatively, the seat mount 18 may provide for some degree of linear adjustment relative to the vehicle 14, as is known in the art.

Referring now to FIGS. 3 and 4, the first embodiment of the reclining actuator 12 is shown connected to the seat back 20 and in a first position. As illustrated, the seat back 20 is reclined or otherwise oriented at a relatively large angle relative to the seat bottom 16. The crank 46 is shown positioned against a first stop 58a, thus establishing a first limit position of the seat back 20. The first stop 58a may be positioned to provide any desired first limit position of the seat back 20 relative to the seat bottom 16. In operation, the driver 28 is energized by way of a switch (not shown) or other device and rotates the crank 46, for example, in a counterclockwise direction to the position shown in FIG. 3. A subsequent clockwise rotation of the crank 46 causes the actuating rod 52 to move the seat back 20 to a substantially upright position, as illustrated in FIG. 4. The crank 46 is shown positioned against the second stop 58b, thus establishing a second limit position. The crank 46 and the actuating rod 52 may, if desired, be stopped in any position between the stops 58a and 58b to position the seat back 20 in a desired intermediate reclining position. The optional second stage recliner 45 reduces or prevents the seat back 20 from back-driving the driver 28. Thus, the crank 46 is enabled to move the rod 52 and the seat back 20. However, the second stage recliner 45, when so provided, reduces or prevents the seat back 20 from actuating the crank 46 and rod 52.

Referring now to FIGS. 5 and 6, there is illustrated a second embodiment of a reclining actuator, shown generally at 112. Where possible, like reference numbers are used to identify elements that are the same as or similar to the first embodiment 12 described above. In the second embodiment of the reclining actuator 112, the output shaft 34 of the driver 28 extends through a mounting plate 136 and is connected to a compound offset crank 146. The compound offset crank 146 includes a crank offset 150 and a pivot offset 170. The crank offset 150 may be substantially the same as described above in relation to the first embodiment crank offset 50. The pivot offset 170 provides a mounting point for a crank pin 148. The crank pin 148 may be configured as a bolt or a stud having a head mounted between the compound offset crank 146 and the mounting plate 136. Alternatively, the crank pin 148 may be secured to the surface of the compound offset crank 146. The pivot offset 170 carries the crank pin 148 in a plane that is offset from the remainder of the compound offset crank 146. The plane of the pivot offset 170 may be substantially parallel to the plane of the remainder of the compound offset crank 146, though such is not required. The plane of the pivot offset 170 may be spaced a distance away from the mounting bracket 136 or closely spaced to thereto, if so desired.

In the second embodiment of the reclining actuator 112, an actuating rod 152 is connected between the seat back 20 and the compound offset crank 146. The actuating rod 152 is shown as a substantially straight rod, though such is not required. The actuating rod 152 includes a latch striker (not shown) located at the end connected to the seat back 20, as described above in the first embodiment. The actuating rod 152 may further include a portion 172 extending beyond the crank pin 148 and away from the seat back 20, though such a structure is not required. FIG. 5 shows the actuator 112 and the seat back 20 articulated in a first position. In operation, the seat back 20 articulates in the same manner as previously described in conjunction with the first embodiment reclining actuator 12. The actuating rod 152 is shown positioned against a first stop 158a thus establishing a first limit position of the seat back 20. The extended portion 172 of the actuating rod 152 may be positioned against the reclining stop 158a, though such is not required. The first stop 158a may be positioned to provide any desired first limit position of the seat back 20 relative to the seat bottom 16.

A second stop 158b is provided to limit travel of the actuating rod 152 and the seat back 20 when moved to an upright position. The second stop 158b is shown positioned to contact the actuating rod 152, though such is not required. Alternatively, the second stop 158b may be positioned in any location to contact the extended portion 172 of the rod 152 when the seat back 20 has reach the desired upright travel limit.

The stops 58 and 158 may alternatively be configured as limit switches which may provide an output signal or terminate power to the driver 28, if so desired. Alternatively, the stops 58 and 158 may be sensors such as, for example, Hall effect sensors that may be programmed as electronic stops.

The Hall effect sensors may be part of the electric motor 32 or integrated into the gear set 32. Such a programmable electronic stop may further include a memory device for storing information such as, for example, extreme end positions of the seat back and user programmed seat positions.

Figure 7:
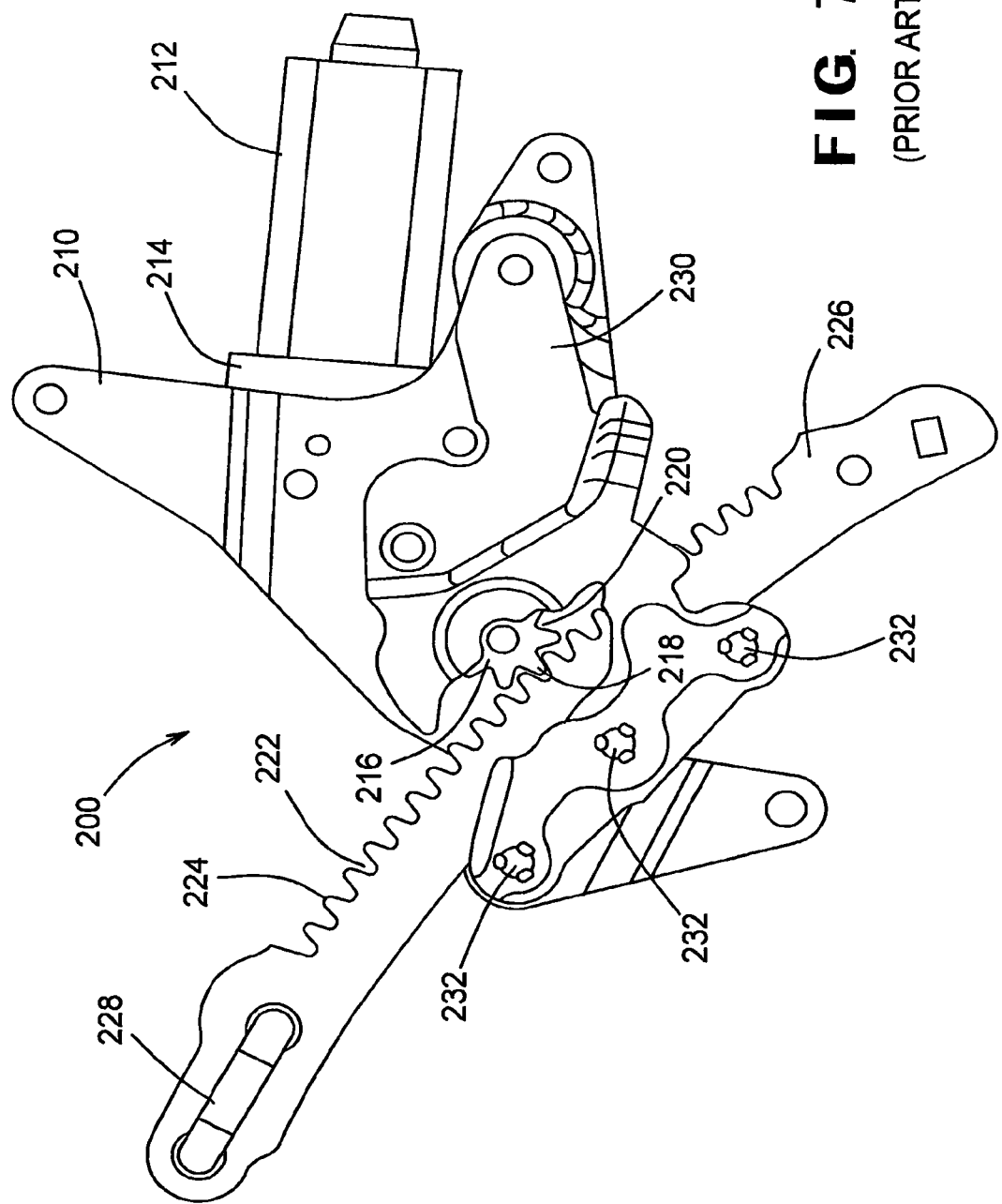
FIG. 7 is a side elevational view of a prior art reclining actuator.

FIG. 7 illustrates a prior art reclining actuator, shown generally at 200. The reclining actuator 200 includes a mounting plate 210 having an electric motor 212 and a gear drive 214 attached thereto. The gear drive 214 transfers the rotary motion of the electric motor 212 to an output pinion 216. The output pinion 216 includes a plurality of alternating teeth 218 and spaces 220 that engage a corresponding plurality of alternating spaces 222 and teeth 224 of a rack 226. The rack 226 is arcuate in shape and includes a latch striker 228 at one end that engages a conventional seat latch. The reclining actuator 200 further includes a cover plate 230 that is fixed to the mounting plate 210 by a plurality of rivets 232. The cover plate 230 retains the output pinion 216 along with any lubricant needed to provide durability for the mating teeth. The cover plate 230 may also retain the output pinion 216 and other related portions of the gear drive 214 in an engaged position. The arcuate shape of the rack 226 may be a radius of curvature having an origin at a hinge centerline, which is the rotational line of the seat back 20 relative to the seat bottom 16. Since the rack 226 has no pivot points other than the latch striker 228, if so configured, the radius of curvature prevents the pinion 216 and gear drive 214 from binding due to offset loadings resulting from different paths of movement of the latch and the rack 226 about the hinge centerline.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An actuator for moving a seat back relative to a seat bottom comprising:
   a mounting plate having a stop provided thereon;
   a crank supported on the mounting plate for movement relative thereto;
   a rod having a first end connected to the crank for movement therewith and a second end adapted to engage a seat back; and
   a driver for moving the crank relative to the mounting plate, wherein one of the crank and the rod contacts the stop to limit movement of the crank and the rod in a first direction.

2. The actuator of claim 1 wherein the crank contacts the stop to limit movement of the crank and the rod.

3. The actuator of claim 1 wherein the rod contacts the stop to limit movement of the crank and rod.

4. The actuator of claim 1 wherein the driver is an electric motor.

5. The actuator of claim 4 wherein the driver further includes a gear set engaged to the electric motor, the gear set having an output shaft oriented at an angle relative to the electric motor.

6. The actuator of claim 1 wherein the crank is a compound offset crank having a crank pin connected to a pivot offset.

7. The actuator of claim 1 wherein the rod includes a latch striker that is selectively engaged with the seat back.

8. The actuator of claim 1 wherein the mounting plate has first and second stops provided thereon, and wherein one of the crank and the rod contacts the first stop to limit movement of the crank and the rod in a first direction and contacts the second stop to limit movement of the crank and the rod in a second direction.

9. An actuator for moving a seat back relative to a seat bottom comprising:
   a mounting plate;
   a crank supported on the mounting plate for movement relative thereto, wherein the crank is a compound offset crank having a crank pin connected to a pivot offset;
   a rod having a first end connected to the crank for movement therewith and a second end adapted to engage a seat back; and
   a driver for moving the crank relative to the mounting plate.

10. An actuator for moving a seat back relative to a seat bottom comprising:
    a mounting plate;
    a crank supported on the mounting plate for movement relative thereto;
    a rod having a first end connected to the crank for movement therewith and a second end adapted to engage a seat back, wherein the rod includes a latch striker that is selectively engaged with the seat back; and
    a driver for moving the crank relative to the mounting plate.

11. The actuator of claim 1 wherein the driver is a manually operated device.

12. The actuator of claim 1 further including a second stage recliner that is positioned between the mounting plate and the crank to reduce or prevent the seat back from moving the crank and the rod.

* * * * *